US008392830B2

(12) United States Patent
Hutchison et al.

(10) Patent No.: US 8,392,830 B2
(45) Date of Patent: Mar. 5, 2013

(54) METHOD AND SYSTEM FOR CODE EDITING

(75) Inventors: Gordon Douglas Hutchison, Hants (GB); David Geoffrey Screen, Hampshire (GB); Joseph Robert Winchester, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 12/167,065

(22) Filed: Jul. 2, 2008

(65) Prior Publication Data
US 2009/0013248 A1 Jan. 8, 2009

(30) Foreign Application Priority Data

Jul. 4, 2007 (EP) ..................................... 07111747

(51) Int. Cl.
*G06F 17/24* (2006.01)
(52) U.S. Cl. ........................................................ 715/256
(58) Field of Classification Search .................. 715/256
See application file for complete search history.

(56) References Cited

U.S. PATENT DOCUMENTS 6,807,548 B1 * 10/2004 Kemper ................................. 1/1
7,150,010 B1 * 12/2006 Ringseth et al. ............... 717/140
7,543,224 B2 * 6/2009 Schwartz ....................... 715/234
2005/0114771 A1 * 5/2005 Piehler et al. ................. 715/536
2008/0052684 A1 * 2/2008 Bowdidge et al. ............ 717/136

OTHER PUBLICATIONS

Li, et al., "CP-Miner: Finding Copy-Paste and Related Bugs in Large-Scale Software Code", IEEE Transactions on Software Engineering, vol. 32, No. 3, Mar. 2006.

* cited by examiner

*Primary Examiner* — Doug Hutton, Jr.
*Assistant Examiner* — Tionna Smith
(74) *Attorney, Agent, or Firm* — Novak Druce Connolly Bove + Quigg LLP

(57) ABSTRACT

A method and system for code editing using copy and paste operations are provided. The method includes copying a section of text (111) from a source program text (101) and providing source context information (120) for the copied section of text (111). The method further includes pasting (140) the copied section of text (111) to a destination location, including: defining the pasted text (140) as separate from the destination program text (102); carrying out editing (132) to conform variables of the pasted text to the variables of the destination program text (102); and then integrating (133) the pasted text into the destination program text (102). The step of carrying out editing to conform variables of the pasted text (140) to the variables of the destination program text (102) references the source context information (120) and context information (104) of the destination program text (102). Providing source context information (120) may either provide a rich schema storable in association with the copied text (111), providing metadata information relating to the variables of the copied text, or may provide a link to the source program code context information (103).

19 Claims, 3 Drawing Sheets

METHOD AND SYSTEM FOR CODE EDITING

FIELD OF THE INVENTION

This invention relates to the field of code editing. In particular, it relates to copy and paste operations between program texts.

BACKGROUND

Copy and paste is carried out to copy program code from a source location to paste it into a destination location in order to avoid re-typing repeated sections of program code. Copy and paste between program texts is carried out in a computer program development environment such as an integrated development environment (IDE). Currently, IDEs copy and paste program code from one program to another as flat program text, and paste is carried out as an atomic operation.

The clipboard is loaded with the copied program code from the source location and the paste destination site is located in some other program text (or in a different location within the same text). The source and destination locations will typically be in well-formed, syntax-highlighted and coloured pieces of program text for which valid abstract syntax trees (AST) have been created by the IDE. When the clipboard contents is pasted, there are frequently problems to address. For example, the newly inserted code may use unheard of variable names, or may not be a fully- or well-formed compound Java statement, or may corrupt the paste location in some other way. The result is an invalid program text that contains syntax errors.

For example, just after pasting in an additional "if statement," a result might appear as follows:

```
    /*
    * If not virtualised, the path in the composite instance will
    * include the part name
    */
    parmPath = part.getName( ) + parmPath;
} else {
    /*
    * Virtualisation, CI will refer to the new name with an empty
    * path...
    */
    parmPath = "";
} if (name.equals(vparm.getName( )) && path.equals((vparmPath))) {
    VirtualisedParameter virt = vparm.getVirtualization( );
    If (virt == null) {
        //log data state error;
    }
    return virt;
}
```

The bottom "if statement" has just been pasted in. The resulting syntax errors can be seen and are shown as underlined. Such errors can occur in both the new and the old program text.

After this paste operation, the program is in exactly the same state as if the text had been typed in. Any text that has just been pasted in has no relation to the source text from which it was taken any more than it does to text that is already in the destination program. The user usually now edits the text to change variables to match the new context, etc.

The user would change all the 'old' names to the 'new' one in the pasted section manually. In the state of the art, "refactor rename" is not usable due to the syntax problems. Also, "change all" is not usable if the source location is in the same program text as the destination location (for example in a different method) and the user does not wish to change the program text.

SUMMARY

It is an aim of the present invention to use the fact that both the destination program and the program that was the source of the pasted text are well-formed programs, to provide a smarter paste operation.

A core feature of the invention is the breaking down of the atomic paste operation into a non-atomic, phased paste where there are one or more stages before the prior art atomic paste operation. Inside the new stage(s), some useful operations can be provided to the programmer.

According to a first aspect of the present invention there is provided a method for code editing, comprising: copying a section of text from a source program text; providing source context information for the copied section of text; pasting the copied section of text to a destination program text, including: defining the pasted text as separate from the destination program text; carrying out editing to conform variables of the pasted text to the variables of the destination program text; and integrating the pasted text into the destination program text. Carrying out editing to conform variables of the pasted text to the variables of the destination program text may reference the source context information and context information of the destination program text.

The context information of the source program text and the context information of the destination program texts may be provided in abstract syntax trees. Defining the pasted text as separate from the destination program text may include storing an identifier in the labelling metadata for a sub-branch of an abstract syntax tree.

In one embodiment, providing source context information may provide a rich schema storable in association with the copied text, providing metadata information relating to the variables of the copied text. The rich schema may provide all the metadata relating to the copied text required to conform the variables with the destination program text; alternatively, the rich schema may provide information that can be used as a hook to get the metadata required.

In an alternative embodiment, providing source context information may provide a link to context information stored for the source program text.

Carrying out editing to conform variables of the pasted text to the variables of the destination program text may include automatically refactoring variables to conform with the destination program text. Refactoring variables may include matching a variable type in the pasted text to a variable type in the destination program text, locating all the instances of the variable in the pasted text, and changing all the instances of the variable in the pasted text to the matched variable of the destination program text. Refactoring variables may also include obtaining a declaration type to determine the variable's definition or use in the source context.

Integrating the pasted text into the destination program text may include discarding the source context information for the pasted text.

According to a second aspect of the present invention there is provided a system for code editing, comprising: means for copying a section of text from a source program text to a clipboard; means for providing source context information for the copied section of text; means for pasting the copied section of text to a destination program text, including: means for defining the pasted text as separate from the destination program text; means for carrying out editing to conform variables of the pasted text to the variables of the destination program text; and means for integrating the pasted text into the destination program text.

According to a third aspect of the present invention there is provided a computer program product stored on a computer readable storage medium, comprising computer readable program code means for performing the steps of: copying a section of text from a source program text; providing source context information for the copied section of text; pasting the copied section of text to a destination program text, including: defining the pasted text as separate from the destination program text; carrying out editing to conform variables of the pasted text to the variables of the destination program text; and integrating the pasted text into the destination program text.

BRIEF DESCRIPTION OF THE DRAWINGS

Embodiments of the present invention will now be described, by way of examples only, with reference to the accompanying drawings in which.

DETAILED DESCRIPTION

Figure 1:
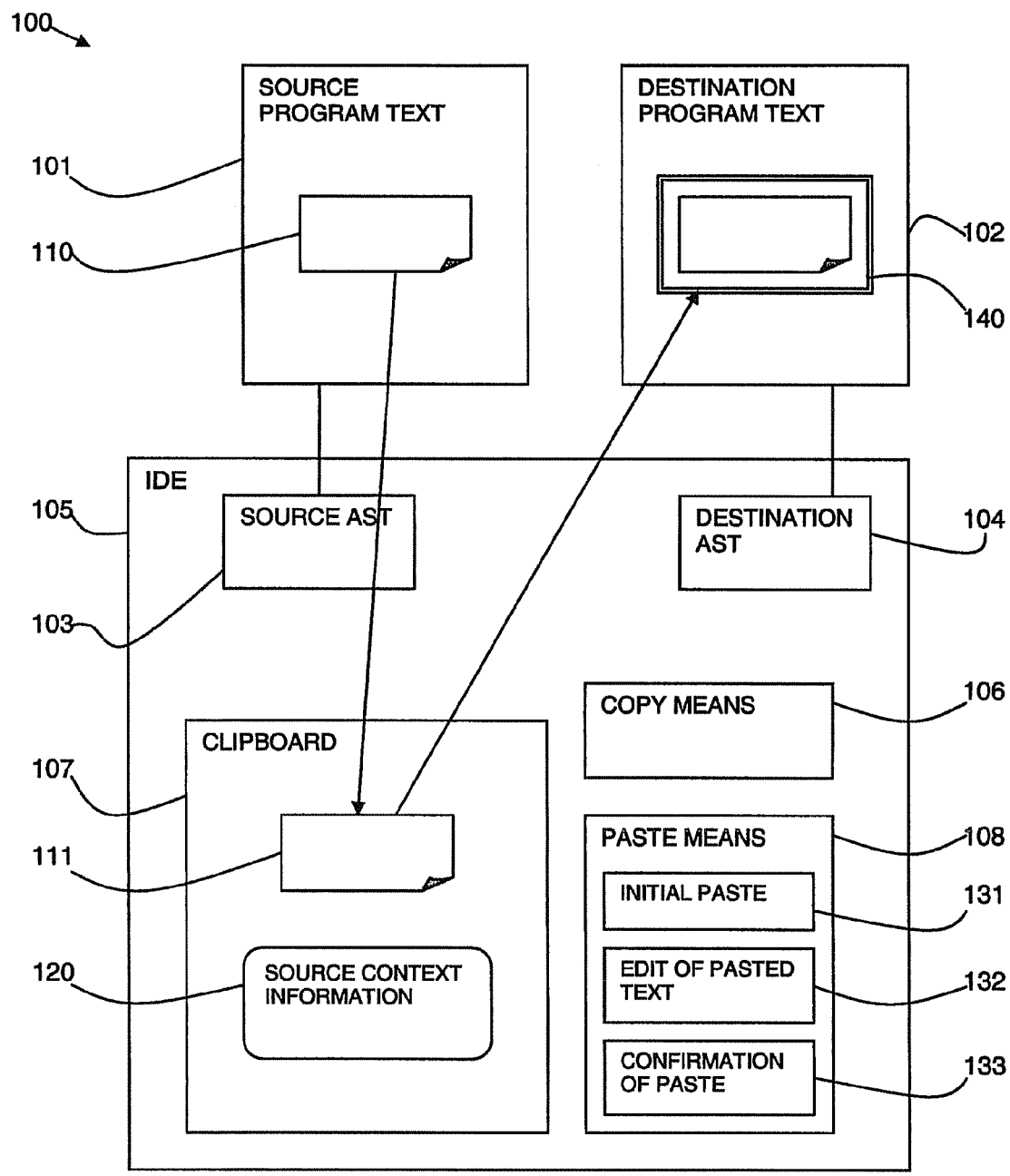
FIG. 1 is a schematic diagram of a system in accordance with the present invention.

A method and system are described for providing improved copy and paste operations for use in computer program development environments. Referring to FIG. 1, a schematic diagram shows a source program text 101 and a destination program text 102. The destination program text 102 and the source program text 101 may be different locations within the same program text or may be in different program texts. A computer program development environment is shown in the form of an Integrated Development Environment (IDE) 105 which carries out the cut and paste operations.

The source program text 101 and the destination program text 102 both have variable contexts defined by the IDE 105, for example in the form of defined abstract syntax trees (AST) 103, 104.

The IDE 105 includes means for copying 106, a clipboard 107 for storing copied text, and a means for pasting 108. The means for copying 106 includes selecting a section of text to be copied 110 in the source program text 101, copying the selected section of text 110, and storing the copied text 111 to the clipboard 107. The means for pasting 108 inserts the copied text 111 into a selected location in a destination program text 102.

In the described system, the IDE 105 includes a means for providing source context information 120 for the copied text 111.

In one embodiment, the means for providing the source context information 120 provides structured information 120 via the clipboard 107. For example, this may be in the form of a rich XML schema which is created and stored in the clipboard 107 when the copy operation is carried out. The structured information may include information from the sub-tree of the AST 103 for the source program text 101 relating to the text being copied 110, the types of variables, and other metadata relating to the text being copied 110.

In another embodiment, the means for providing the source context information 120 provides a link to the AST 103 of for the source program text 101.

The means for pasting 108 includes sub-operations. A first paste sub-operation 131 pastes the copied text 111 to the destination program text 102 in a corralled form of pasted text 140. The corralled form of pasted text 140 means that the copied text 111 is inserted into the destination program text 102 but is kept as a fenced entity and is not initially integrated into the destination program text 102.

The next paste sub-operation 132, edits the corralled form of the pasted text 140 with reference to the context information (for example, the AST 104) of the destination program text 102 and the source context information 120 relating to the copied text 111.

A final paste sub-operation 133, confirms the paste operation and integrates the edited corralled form of pasted text 140 into the destination program text 102, and the source context information 120 of the copied text 111 is discarded. Manual editing of the integrated pasted text in the destination program text 102 can then be carried out as required.

Figure 2:
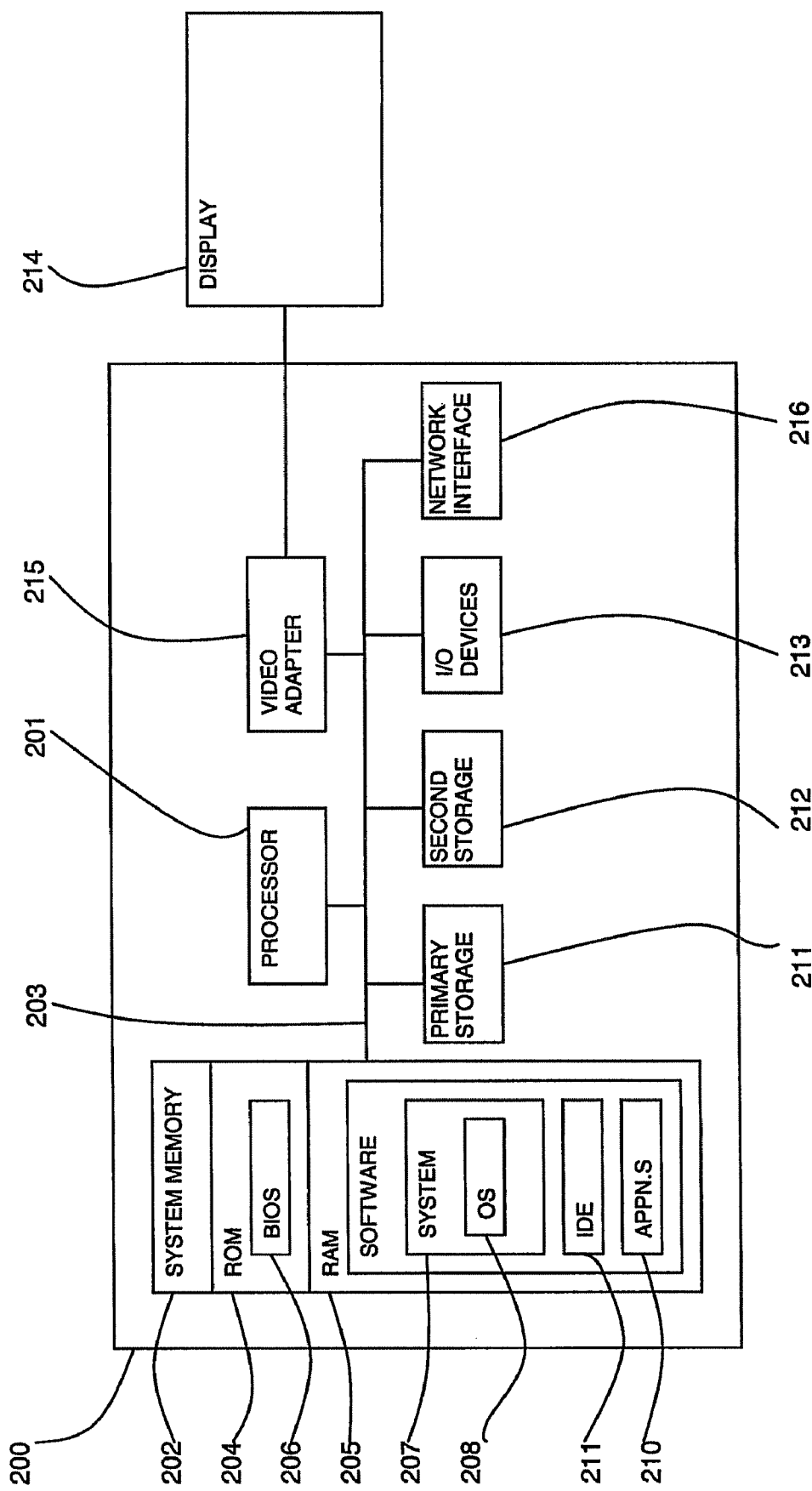
FIG. 2 is a block diagram of a data processing system in which the present invention can be implemented.

Referring to FIG. 2, an exemplary system for implementing the described system includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. An Integrated Development Environment (IDE) 211 as well as software applications 210 may also be stored in RAM 205. Although the IDE 211 and the applications 210 are shown as being contained within the RAM 205, in other embodiments either or both may be on different electronic devices and may be accessed remotely, for example, via a network.

The IDE 211 includes an editor capable of manipulating the code in an application 210. In an embodiment, the IDE 211 includes instructions capable of executing on the processor 201. The IDE 211 may be implemented in hardware via logic gates and/or other appropriate hardware techniques in place of or in addition to a processor-based system. An application 210 may be any appropriate software code. An application 210 is capable of being manipulated by the IDE 211.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

The sub-steps of the paste operation, initially corral pasted text and prevent it from corrupting the syntax/parsing of the destination text it is being pasted into. Furthermore, the means for providing the source context information prevents the copied text from initially loosing all semantic information and preventing spurious syntax errors being seen as "real" errors until the paste operation is complete. This enables the pasted text to remain as appearing as well formed, for the purposes of code-completion, name refactoring, etc. The user-visible indication of outstanding problems remains, but the system also has a much richer model to use for the integration of the pasted text into its new contexts.

In a described embodiment, the source context information is provided by an abstract syntax tree for a program. The abstract syntax tree is a data structure that mirrors the tree-like nature of the structure of a program. For example a piece of code like:

```
{
    String sauce;    /* We like our sauce */
    if( dinner == turkey){
        sauce = "cranberry";
    }else{
        sauce = "tomato"
    }
    putSauceOnTable( sauce );
}
```

In the above example, there is a tree with a sequence of three subparts which are branches of the tree:
1) a variable declaration;
2) an if statement;
3) a method/function call;

Each subpart (branch of the tree) is expressed in a similar manner, i.e. another (sub) tree.

So, for example, the variable declaration (1) has three branches:
 a header of metadata e.g., the fact it is a variable declaration;
 where it fits into the tree, the source file and line number etc.;
 plus its contents:
  1.1) a type;
  1.2) a name;
  1.3) a comment.

The if statement (2) has three branches:
 a header of metadata e.g., the fact it is an if statement;
 where it fits into the whole tree, the source file and line number etc.;
 plus its contents:
  2.1) the Boolean conditional expression;
  2.2) link to the true sub-tree;
  2.3) link to the false sub-tree.

The true sub-tree would be an AST data structure for the bracketed statement "{ . . . }".
 a header of metadata, for example, the fact that it is a scope block;
 where it fits into the whole tree, the source file and line number etc.;
 plus its contents:
  2.2.1 a sequence of:
   an assignment statement link to . . .

a header of metadata, for example, the fact it is an assignment;
where it fits into the whole tree, the source file and line number etc.;
plus its contents:
 2.2.1.1 a variable identifier
 2.2.1.2 an expression link to . . .
 a header of metadata, for example, the fact it is an expression;
 where it fits into the whole tree, the source file and line number etc.;
 plus its contents:
  2.2.1.2.1 the type of the expression
  2.2.1.2.2 the expression tree, for example (3*4)+ (2+1) is sort of (with the "operator as the fork of the tree and the operands as each branch") +(*3, 4),(+2,1)

To implement the fact that a small portion of the program text is in the intermediate pasted-not-finalised mode, a new type of identifier for a sub-branch of the abstract syntax tree is included, stored in the labeling metadata for any sub-branch that says:

THIS_IS_PASTED: "this new sub-branch of the abstract syntax tree is pasted text";
STATE: unfinalized "the user has not yet said they are finished with referring to the source location";
SOURCE: AST_LOCATION_KEY=1.2.3.1.2.4.1 "identifies the location in the AST where the code was copied from".

In the first described embodiment, the source context information is provided as structured information via the clipboard. For example, this structured information may be in the form of a rich XML schema of the information from the sub-tree of the AST for the source program text relating to the text being copied, including the types of variables, and other metadata relating to the text being copied.

The use of structured/rich information transfer via the clipboard is known, for example, storing the font of text. The transfer is extended to create a rich XML schema to hold source context information on the text being copied. At the copy operation, an XML document is created and placed in the clipboard which holds information on the AST of the text being copied, the type of the variables and other information that may come from outside the copy area. The paste operation can then make additional use of this information. The XML schema stores information that can be uses as a hook to get the metadata needed.

The XML schema may be rich enough (for example, containing variable type declarations, etc.) so that the copied clipboard text is independent of its source location.

Using the example implementation given above, on the copy operation the clipboard may be loaded with a rich set of meta data, such as:
<variable name=fred type=String declaration_location_in_AST=1.2.3.1.2.4.3>
and this information is inserted into the new target locations AST on paste and used by the IDE.

In the second described embodiment of providing a link to the context source location, the IDE uses the link above "1.2.3.1.2.4.1" to go and look elsewhere in the AST to resolve questions such as "what type is this variable called 'fred'".

In the second embodiment, a link is provided to the actual file and AST information of the source program code, the in-memory abstract syntax tree (AST) representation of the parsed program text that contains a rich model of what the program text represents. This can be used to help with type information, refactoring, code completion and other operations. Such ASTs are typically only built for valid (or almost valid) Java program text and the newly pasted text is not fully valid in situ as an extract. However, it is a valid sub-tree of the AST of the program from which it was copied.

The AST sub-tree for the pasted text may be built as a duplicate of the AST that represented it in the source location and retains a link to the original 'parent' AST for the whole source context. However, any changes that are made to the pasted text are only made to a duplicate of the source program's AST data structure that is associated with the paste operation and not to the clipboard text in its original source location.

As there is type information provided on both the destination program text and the source program text, the variables of the pasted text can be matched to the destination program text based on type.

For example, in the example given in the introduction above, the variable "path" in the new text is of the same type as the existing variable "parmPath". Using the retained source context information, the paste operation can now offer an automatic rename-refactor on each element of pasted text above that is underlined.

Additionally, where there is a type match to an existing variable, the existing, type-matched, variable names will be offered as a new name/match. If such a match is accepted, because the source context information for the pasted text is available it is easy to locate every occurrence of this "old" variable and change the text to refer to the equivalent one in the new context but only in the corralled, newly pasted in program text.

For variables where the user declines any such matching (for example, such as "virt;" above), as the source context information for the source location is available, a go-to-declaration type operation (F3 in Eclipse, Eclipse is a trade mark of The Eclipse Foundation) can now be used to see what the variable is defined as or how it is used in the original context of the code being pasted in order to help the user.

Once the user is satisfied that the paste is as good as it can be prior to manual intervention, a "paste-complete" operation is carried out and the old context of the pasted in text is discarded and the paste location flattened out into one single context (for example, as a single AST). Any subsequent manual editing is then done as before but this should be much reduced.

Figure 3:
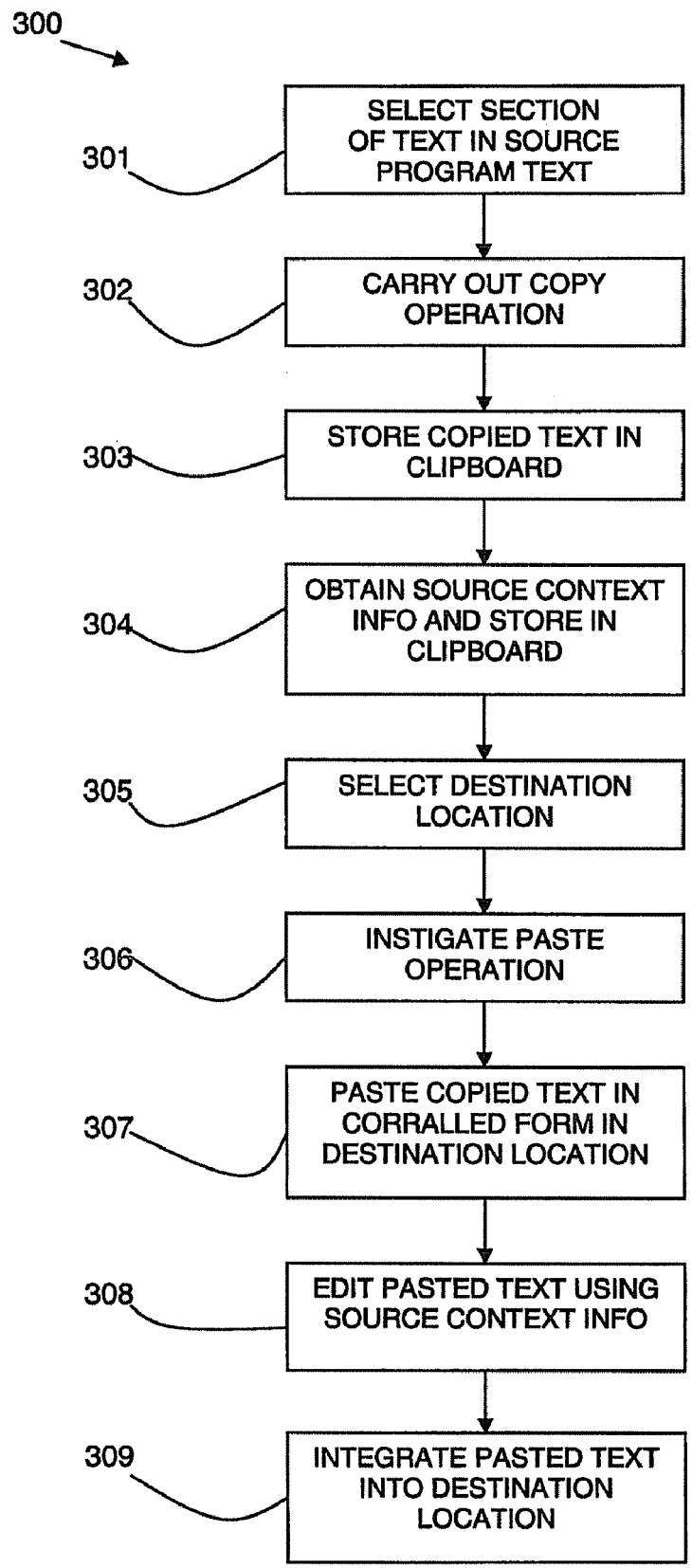
FIG. 3 is a flow diagram of a method in accordance with the present invention.

Referring to FIG. 3, a flow diagram 300 shows the general steps of the described method. A section of text is selected 301 in the source program text and a copy operation carried out 302. The copied text is stored 303 in a clipboard. Source context information is obtained and stored 304 in the clipboard. For example, as a rich metadata schema, or as a link to context information in the source program text.

A destination location is selected 305 and a paste operation is instigated 306. The paste operation includes the sub-operations of:

pasting 307 the copied text into the destination text as a corralled paste;

carrying out 308 automated or semi-automated editing using the source context information and destination context information to conform variables; and integrating 309 the edited pasted text, including discarding the source context information for the pasted text.

Any additional manual editing can then take place of the integrated pasted text.

In the paste operation, some editing can be offered automatically on pasting, for example:

For variables names that are not in scope (are not defined yet)—an equivalent local variable of compatible type can be offered as the replacement in all places in the pasted text. Where there is more than one candidate, the user can select from a list. Once selected all occurrences are 'renamed'.

A new variable declaration can also be inserted from the declaration of the original variable in its source location. For new types that are used, these can be 'imported' as exactly the same type they represented in the source location.

When copying a method within a class, the method needs a new name etc. Until this is done the 'original' method is not marked as 'equally/symmetrically' invalid.

Bracket matching balancing. It is uncommon to paste in an unmatched/paired sequence of brackets. This can cause subtle/hard errors as unmatched brackets 'consume' distant matches in the original text. The paste operation can warn and auto-fix such bracket leakage/impact outside the paste scope.

Retention of the above benefits 'after' pasting.

The user can re-enter the corralled pasted text, whenever the cursor is inside or at the end of the pasted text. When the user selects a gesture to accept newly pasted text, the pasted text is flattened out the destination text and integrated fully into the destination program code. Until this is done the new facilities are available, for example, it can provide a useful go-to-original-context option if the user needs to go back and get or check something further from the source location.

Using the rich model of the source context information that is now available, it is clearly envisaged that there may be further program tools/operations that are helpful to the user not mentioned here.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for code editing, comprising:
copying a section of text from a source program text to yield a copied section of text;
storing source context information pre-defined for the copied section of text;
pasting the copied section of text to a destination program text, the pasting including causing a processor to automatically perform the acts of:

inserting the copied section of text into the destination program text as a fenced entity that is not integrated into the destination program text to yield pasted corralled text;

carrying out editing to conform variables of the pasted corralled text inserted in the destination program text to the variables of the destination program text by referencing the source context information and context information of the destination program text; and after the editing, integrating the pasted corralled text into the destination program text, wherein the integrating comprises discarding the source context information for the pasted text, wherein prior to the integrating, the pasted corralled text is prevented from affecting a parsing of the destination program text.

2. The method of claim 1, wherein the context information of the source program text and the context information of the destination program texts are provided in abstract syntax trees.

3. The method of claim 2, wherein the inserting of the pasted corralled text into the destination program text includes storing an identifier in the labeling metadata for a sub-branch of an abstract syntax tree.

4. The method of claim 1, wherein the source context information provides a rich schema storable in association with the copied section of text, providing metadata information relating to the variables of the copied section of text.

5. The method of claim 4, wherein the rich schema provides all the metadata relating to the copied section of text required to conform the variables with the destination program text.

6. The method of claim 4, wherein the rich schema provides information that can be used as a hook to get the metadata required.

7. The method of claim 1, wherein the source context information provides a link to context information stored for the source program text.

8. The method of claim 1, wherein the carrying out of editing to conform variables of the pasted text to the variables of the destination program text includes automatically refactoring variables to conform with the destination program text.

9. The method of claim 8, wherein refactoring variables includes matching a variable type in the pasted text to a variable type in the destination program text, locating all the instances of the variable in the pasted corralled text, changing all the instances of the variable in the pasted text to the matched variable of the destination program text.

10. The method of claim 8, wherein refactoring variables includes obtaining a declaration type to determine the variable's definition or use in the source context.

11. A system for code editing, comprising:
means for copying a section of text from a source program text to a clipboard to yield a copied section of text;
means for storing source context information pre-defined for the copied section of text;
means for pasting the copied section of text to a destination program text to yield a pasted text, including means for causing a processor to automatically perform the acts of:
inserting the copied section of text into the destination program text as a fenced entity that is not integrated into the destination program text to yield pasted corralled text;
carrying out editing to conform variables of the pasted corralled text inserted in the destination program text to the variables of the destination program text by referencing the source context information and context information of the destination program text; and
after the editing, integrating the pasted corralled text into the destination program text, wherein the integrating comprises discarding the source context information for the pasted text,
wherein prior to the integrating, the pasted corralled text is prevented from affecting a parsing of the destination program text.

12. The system of claim 11, wherein the context information of the source program text and the context information of the destination program texts are provided in abstract syntax trees.

13. The system of claim 12, wherein the inserting of the pasted corralled text into the destination program text includes providing an identifier in the labeling metadata for a sub-branch of an abstract syntax tree.

14. The system of claim 11, wherein the source context information provides a rich schema storable in association with the copied section of text, providing metadata information relating to the variables of the copied section of text.

15. The system of claim 14, wherein the rich schema provides all the metadata relating to the copied section of text required to conform the variables with the destination program text.

16. The system of claim 15, wherein the rich schema provides information that can be uses as a hook to get the metadata required.

17. The system of claim 11, wherein the source context information provides a link to context information stored for the source program text.

18. The system of claim 11, wherein the carrying out of editing to conform variables of the pasted text to the variables of the destination program text includes automatically refactoring variables to conform with the destination program text.

19. A computer readable storage medium having stored thereon a computer program, the computer program comprising computer readable program code means for performing the steps of:
copying a section of text from a source program text to yield a copied section of text;
storing source context information pre-defined for the copied section of text;
pasting the copied section of text to a destination program text to yield a pasted text, the pasting including causing a processor to automatically perform the acts of:
inserting the copied section of text into the destination program text as a fenced entity that is not integrated into the destination program text to yield pasted corralled text;
carrying out editing to conform variables of the pasted corralled text inserted in the destination program text to the variables of the destination program text by referencing the source context information and context information of the destination program text; and
after the editing, integrating the pasted corralled text into the destination program text, wherein the integrating comprises discarding the source context information for the pasted text,
wherein prior to the integrating, the pasted corralled text is prevented from affecting a parsing of the destination program text.

* * * * *